United States Patent [19]
Sheasby et al.

[11] Patent Number: 5,995,079
[45] Date of Patent: Nov. 30, 1999

[54] METHOD FOR CONTROLLING A VARIABLE OF A DIALOG BOX WITH CURSOR MOVEMENT

[75] Inventors: Michael C. Sheasby, Longueuil; Luis Talavera, Westmount; A. Michael Mondry, Nuns' Island, all of Canada

[73] Assignee: Avid Technology, Inc., Tewksbury, Mass.

[21] Appl. No.: 08/834,512

[22] Filed: Apr. 4, 1997

[51] Int. Cl.⁶ .................................................. G06F 3/00
[52] U.S. Cl. ........................ 345/145; 345/339; 345/974
[58] Field of Search .................................. 345/326–358, 345/974, 145, 146

[56] References Cited

U.S. PATENT DOCUMENTS

| | | | |
|---|---|---|---|
| 5,392,388 | 2/1995 | Gibson | 345/974 |
| 5,452,413 | 9/1995 | Blades | 345/974 |
| 5,491,782 | 2/1996 | King et al. | 345/974 |
| 5,495,566 | 2/1996 | Kwatinetz | 345/341 |
| 5,559,301 | 9/1996 | Bryan, Jr. et al. | 345/974 |
| 5,596,699 | 1/1997 | Driskell | 345/352 |
| 5,611,060 | 3/1997 | Belfiore et al. | 345/341 |
| 5,615,347 | 3/1997 | Davis et al. | 345/974 |
| 5,625,782 | 4/1997 | Soutome et al. | 345/341 |
| 5,682,488 | 10/1997 | Gleason et al. | 345/974 |
| 5,682,489 | 10/1997 | Harrow et al. | 345/349 |
| 5,721,853 | 2/1998 | Smith | 345/353 |
| 5,751,285 | 5/1998 | Kaskiwagi et al. | 345/349 |
| 5,798,760 | 8/1998 | Vayda et al. | 345/352 |

OTHER PUBLICATIONS

Microsoft Windows User's Guide, v3.0, Microsoft Corp., p. 304, 1990.
Hopkins, "The Design and Implementation of Pie Menus", Dr. Dobb's Journal, pp. 16–18, 20, 22, 24, 26, 94, Dec. 1991.
Hopkins et al., "Pies: Implementation, Evaluation, and Application of Circular Menus", University of Maryland, pp. 1–27, 1988.
Microsoft Press Computer Dictionary, 2nd. Ed., Microsoft Press, pp. 391–393, 1994.

*Primary Examiner*—John E. Breene

[57] ABSTRACT

A user interface receives user input representative of movement of a mouse pointer relative to a datum point. This datum point is established as a origin with four quadrants. The movement is determined to be either in a first sense or an opposite second sense relative to the datum point. A variable responsively increments when the movement is in the first sense and responsively decrements when the movement is in the second opposite sense. The user may move the pointer in a generally circular or spiral pattern in a clockwise or counterclockwise sense about the origin until the desired value is attained.

6 Claims, 2 Drawing Sheets

LEGEND
10 - CONTROL BOX
12 - BAR GRAPH
14 - DISPLAY WINDOW
15 - NUMERIC VALUE
16 - MOUSE POINTER
18 - BAR GRAPH EDGE

LEGEND
10 - CONTROL BOX
12 - BAR GRAPH
14 - DISPLAY WINDOW
15 - NUMERIC VALUE
16 - MOUSE POINTER
18 - BAR GRAPH EDGE

METHOD FOR CONTROLLING A VARIABLE OF A DIALOG BOX WITH CURSOR MOVEMENT

FIELD OF THE INVENTION

The present invention relates a method for controlling a variable of a user interface. More specifically, the present invention relates to a method for increasing and decreasing a displayed variable of a dialog box.

BACKGROUND OF THE INVENTION

In many applications, a dialog box is provided to allow the user to manipulate a value of a displayed variable. Typically, a number representative of the current value of the variable is displayed together with a bar graph proportional to the displayed number. The user moves the mouse pointer to an "up" button or a "down" button and repeatedly clicks or holds until the desired value is attained. Alternatively, the user moves the mouse pointer and clicks on the bar graph, drags the bar to a desired value or double clicks and the bar responsively moves to the mouse pointer.

In other applications, the user can vary the displayed value by mousing down within the boundaries of the control and dragging the mouse pointer horizontally across the screen, and releasing once the desired value is attained.

The prior art user interfaces are considered too slow for certain applications. If the user wishes to make large scale changes to a precise value, the user must first click on the bar graph to make a large scale change and then move the mouse pointer to click on the "up" and "down" buttons until the precise value is attained.

For click and drag interfaces, the mouse pointer can hit the edge of the screen before attaining the desired value. The user must then release the mouse button, move the mouse pointer back to the control in question and re-start the process to attain the desired precise value.

SUMMARY OF THE INVENTION

The disadvantages of the prior art may be overcome by providing a user interface for controlling a value of a variable which obviates or mitigates at least one of the disadvantages of the prior art systems.

It is desirable to provide a novel user interface user interface comprising:

means for receiving user input representative of movement of a mouse pointer relative to a datum point, means for correlating the movement to either an increment or a decrement of a variable; and means for responsively effecting the increment or decrement.

It is desirable to provide a user interface which receives user input representative of movement of a mouse pointer relative to a datum point. The movement is determined to be either in a first sense or an opposite second sense relative to the datum point. A variable responsively increments when the movement is in the first sense and responsively decrements when the movement is in the second opposite sense.

It is still further desirable to provide a novel user interface wherein the means for correlating comprises:

means for establishing the datum point as an origin of four quadrants defined by first and second orthogonal axes;

means for determining the present quadrant in which the mouse pointer is moving;

means for calculating a change in position relative to the first and second orthogonal axes of the mouse pointer movement;

means for correlating the change in position with the quadrant;

means for incrementing the parameter when the mouse pointer movement is in a first sense about the origin and for decrementing the parameter when the mouse pointer movement is in a second sense opposite the first sense.

It is still further desirable to provide a user interface, wherein the means for correlating comprises:

means for establishing a datum point as an origin of a first and second orthogonal axes;

means to calculate a first change in position of the mouse pointer relative to the first axis;

means to calculate a first relative position of said mouse pointer relative to the datum point along said second axis;

means to calculate a second change in position of said mouse pointer relative to the second axis;

means to calculate a second relative position of the mouse pointer relative to the datum along the first axis;

wherein the means to correlate responsively increments when the first change in position is greater than zero and said first relative position is greater than zero, or when said second change in position is greater than zero and the second relative position is less than or equal to zero; and the means to correlate responsively decrements when the first change in position is less than zero and the first relative position is less than zero, or when the second change in position is greater than zero and the second relative position is greater than zero or equal to zero.

According to one aspect of the invention, there is provided a method for altering a parameter of a user interface with movement of a mouse pointer. The method comprises the steps of:

(i) establishing a datum point as an origin of four quadrants defined by first and second orthogonal axes;

(ii) determining the present quadrant in which the mouse pointer is moving;

(iii) calculating a change in position relative to the first and second orthogonal axes of the mouse pointer movement;

(iv) correlating the change in position with the quadrant; incrementing the parameter when the mouse pointer movement is in a first sense about the origin and decrementing the parameter when the mouse pointer movement is in a second sense opposite the first sense; and (v) repeating steps (ii) to (iv) while the mouse pointer is moving.

According to another aspect of the invention, there is provided a computer implemented control system for altering a parameter of a user interface. The system comprises:

means to receive user input representative of a mouse pointer moving relative to a datum point;

means to correlate the user input to increment and decrement the parameter, comprising:

means for establishing the datum point as an origin of four quadrants defined by first and second orthogonal axes;

means for determining the present quadrant in which the mouse pointer is moving;

means for calculating a change in position relative to the first and second orthogonal axes of the mouse pointer movement;

means for correlating the change in position with the quadrant;

means for incrementing the parameter when the mouse pointer movement is in a first sense about the origin and for decrementing the parameter when the mouse pointer movement is in a second sense opposite the first sense; and means to responsively effect the increment or decrement of the parameter.

According to another aspect of the invention, there is provided a method for altering a parameter of a user interface with movement of a mouse pointer. The method comprises the steps of:

(i) establishing a datum point as an origin of four quadrants defined by first and second orthogonal axes;

(ii) determining the present quadrant in which the mouse pointer is moving;

(iii) calculating a change in position relative to said first and second orthogonal axes of the mouse pointer movement;

(iv) correlating the change in position with the quadrant; incrementing the parameter when the mouse pointer movement is in a first sense about the origin and decrementing the parameter when the mouse pointer movement is in a second sense opposite the first sense; and (v) repeating steps (ii) to (iv) while the mouse pointer is moving.

According to yet another aspect of the invention, there is provided an article of manufacture comprising:

a computer usable medium having computer readable program code means embodied therein for implementing a user interface. The computer readable program code means in the article of manufacture comprises:

computer readable program code means for causing the computer to accept input from a user representing movement of a mouse pointer relative to a datum point;

computer readable program code means for causing the computer to correlate the movement to either an increment or a decrement of a variable, comprising:

computer readable program code means for establishing said datum point as an origin of four quadrants defined by first and second orthogonal axes;

computer readable program code means for determining the present quadrant in which the mouse pointer is moving;

computer readable program code means for calculating a change in position relative to the first and second orthogonal axes of the mouse pointer movement;

computer readable program code means for correlating the change in position with the quadrant;

computer readable program code means for incrementing the parameter when the mouse pointer movement is in a first sense about the origin and for decrementing the parameter when the mouse pointer movement is in a second sense opposite the first sense; and computer readable program code means for causing the computer to responsively effect the increment or decrement.

According to yet another aspect of the invention, there is provided a user interface comprising:

means for receiving user input representative of movement of a mouse pointer relative to a datum point, means for determining whether the movement is in a first sense or an opposite second sense relative to the datum point; and means for responsively incrementing a variable when the movement is in the first sense and responsively decrementing the variable when the movement is in the second opposite sense.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
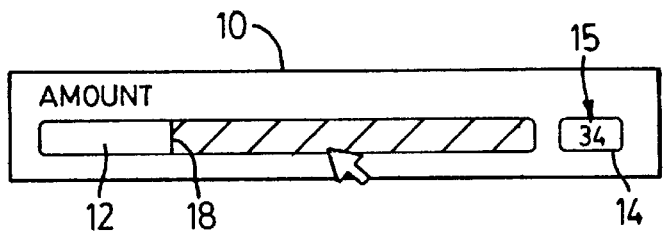
FIG. 1 is a user interface for a control box before changing the displayed value.

Referring to FIG. 1, a control box 10 is illustrated. The control box has a bar graph 12 and a display window 14. The bar graph 12 is operatively connected to the displayed numeric value 15. In the preferred embodiment, bar graph 12 will be representative of a value between 0 and 100 as a percentage. The displayed numeric value 15 will correspond to the percent value of the bar graph 12. By way of example only, the displayed numeric value 15 is the numeral "34".

Figure 2:
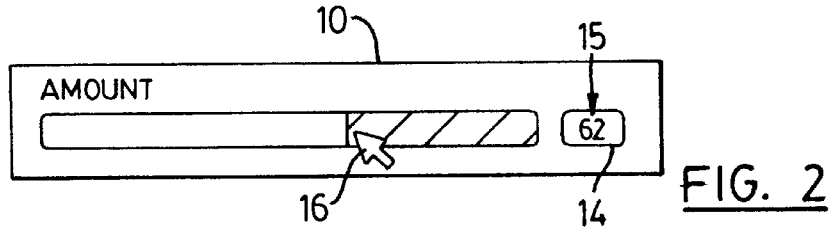
FIG. 2 is a user interface for a control box after changing the displayed value in a large increment to the value of the mouse pointer.

Referring to FIG. 2, the user moves the mouse pointer 16 to a desired position along the bar graph 12. The user double clicks the left mouse button and the bar graph 12 will responsively move to the mouse pointer 16. The displayed numeric value 15 will increase to the corresponding value. Continuing the example, the numeric value 15 increases to "62".

Additionally, the Shift key could be enabled to provide "scaled" dragging. The user holds down Shift while dragging to reduce the mouse movement by some scale. More precise changes to the variable can be made. For example, moving the mouse pointer 16 with the Shift key down changes the variable by half the amount it would normally be changed without the Shift key pressed.

Alternatively, the user can move the mouse pointer 16 to the edge 18 between contrasting sides of bar graph 12, click and drag the edge to a desired position. The displayed numeric value 15 will responsively change.

In these methods, the precision of the numeric control depends on the size of the bar graph 12 and the relative position of the control box 10 on the screen. The edge 18 moves to the x value of the mouse pointer 16. The incremental change of the x value is limited to the movement of the mouse pointer 16.

In a further alternative, the user may highlight the displayed numeric value 15 and directly key a new value. However, this method is relatively slow and requires the user to move the mouse operating hand from the mouse to the keyboard.

Figure 3:
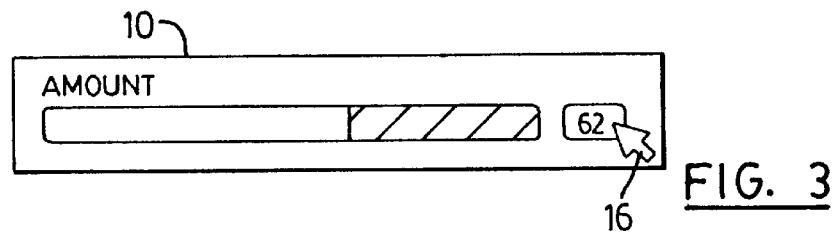
FIG. 3 is a user interface for a control box before changing the displayed value in a small increment.
Figure 4:
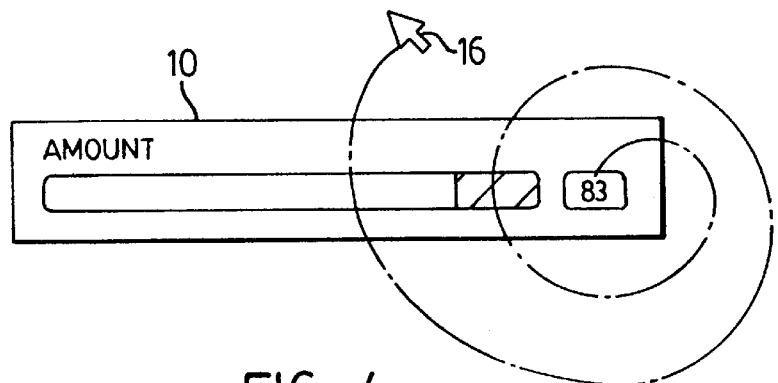
FIG. 4 is a user interface for a control box during changing the displayed value by the present invention.

Referring now to FIGS. 3 and 4, the mouse pointer 16 is moved to the display window 14, and the left mouse button is depressed and then dragged away from the display window 14. The user drags the mouse pointer 16 in a generally circular or spiral pattern in a clock-wise sense. The displayed numeric value 15 responsively increases. The displayed numeric value 15 responsively decreases when the user drags the mouse pointer in a generally circular of spiral pattern in a generally counter-clockwise sense. When the displayed numeric value 15 attains a desired value, the user releases the button.

Figure 5:
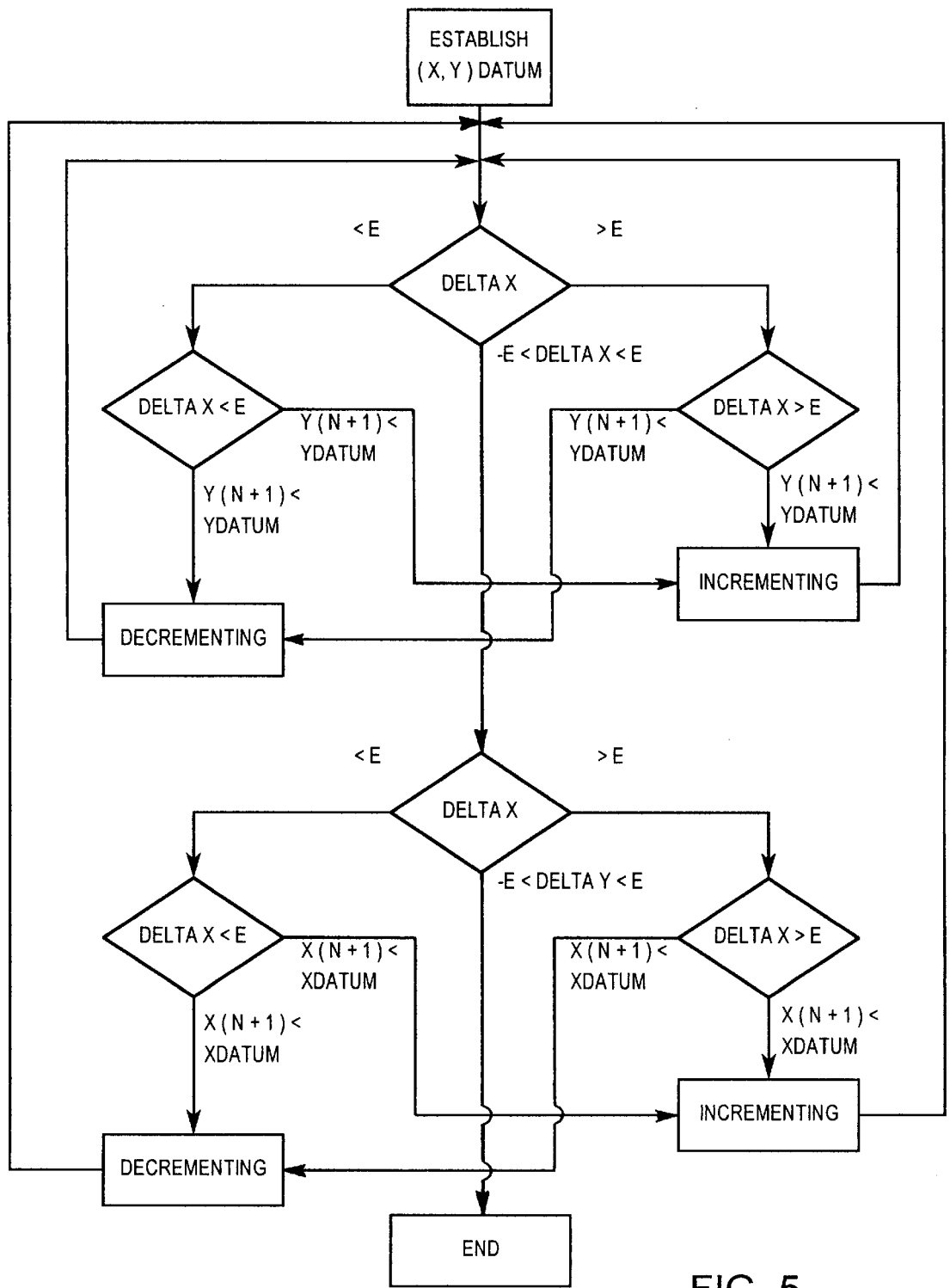
FIG. 5 is a flowchart of the method of the present invention.

Referring to FIG. 5, the movement of the mouse pointer 16 is correlated to a reference or datum point (x, y) datum which can be established by the clicking of the left mouse button on the display window 14. Four quadrants are established about the datum point defined by the x axis and the y axis. When the mouse pointer 16 is incrementally moving, the change in the x value (delta x) is first calculated. Delta x is the change in x of the next incremental position (n+1) with respect to the previous position (n). If delta x is greater than e, a value approximately equal to 0, and the y value of the mouse pointer 16 y(n+1) is above they value of the datum point, the movement of the mouse pointer is correlated to an increment. If the y value of the mouse pointer 16 y(n+1) is below they value of the datum point, then the movement of the mouse pointer is correlated to a decrement.

In other words, a left to right movement of the mouse pointer 16 above the datum point is an increment and below the datum point is a decrement. A right to left movement of the mouse pointer 16 above the datum point is a decrement and below the datum point is an increment.

If delta x is equal to the magnitude of e, then the process proceeds to the next step.

The change in the y value (delta y) is then calculated. If delta y is greater than e and the x value of the mouse pointer 16 x(n+1) is left of or less than the x value of the datum point, then the movement of the mouse pointer 16 is correlated to an increment. If delta y is greater than e and the x value of the mouse pointer 16 x(n+1) is right of or greater than the x value of the datum point, then the movement of the mouse pointer 16 is correlated to a decrement.

If delta y is less than e and the x value of the mouse pointer 16 is right or greater than the x value of the datum point, then the mouse pointer movement is correlated to a increment. If delta y is less than e and the x value of the mouse pointer 16 is left of or less than the x value of the datum point, then the mouse pointer movement is correlated to an decrement.

In other words, a top to bottom movement of the mouse pointer 16 left of the datum point is a decrement and right of the datum point is an increment. A bottom to top movement of the mouse pointer 16 right of the datum point is a decrement and left of the datum point is an increment.

The process is repeated until the mouse pointer 16 stops moving, i.e. when delta x and delta y are approximately equal to e. e can be any pre-selected value which close to zero (0).

As the mouse pointer 16 moves from quadrant to quadrant the rules for incrementing and decrementing remain true. As a result, the user is able to move in a generally circular or scrubbing motion in a first sense to incrementally increase or in an opposite sense to decrease or scroll the value of variable represented by the displayed numeric value 15.

Additionally, moving the mouse pointer 16 between adjacent quadrants while remaining either above or below or either left or right of the datum point (i.e., in two adjacent quadrants) will linearly scroll the displayed numeric value 15. In other word, the user can move the mouse point 16 in a straight line if desired It is apparent that so long as the user does not release the mouse button, the method of the present invention will continue to increment or decrement. In other words, the user is not required to release, move back to the display window 14 to re-initiate the process. The user may move in a clockwise or counterclockwise sense about the origin until the desired value is attained.

In the present example, the datum point has been described as being established by moving the mouse pointer 16 to the display window 14 and then clicking the left mouse button. However, it is now apparent to those skilled in the art that the datum point could be established using other methods. For example, the right mouse button could be used to drop a menu which lists the available variables which could be altered. The use moves the mouse pointer 16 to the desired variable, clicks to initiate the present invention. The clicking on the desired variable could be used to initiate the origin or datum point at either a predetermined location on the screen or at the point where the mouse pointer is pointing at the time of clicking. The user can then move the mouse pointer 16 about the newly established datum point to alter the value of the selected variable.

It is now apparent to those skilled in the art that the present invention is not limited to altering or scrolling a numeric value. The present invention could be operatively connected to scroll through a document of a word processing document.

The above-described embodiments of the invention are intended to be examples of the present invention and alterations and modifications may be effected thereto, by those of skill in the art, without departing from the scope of the invention which is defined solely by the claims appended hereto.

We claim:

1. A user interface comprising:
means for receiving user input representative of velocity of a mouse pointer relative to a datum point;
means for correlating said velocity to either an increment or a decrement of a variable by establishing said datum point as an origin of four quadrants defined by first and second orthogonal axes, determining the present quadrant in which the mouse pointer is moving, calculating a change in position relative to said first and second orthogonal axes of said mouse pointer movement, correlating said change in position with said quadrant, and incrementing said variable when said mouse pointer movement is in a first sense about said origin and for decrementing said variable when said mouse pointer movement is in a second sense opposite said first sense; and
means for responsively effecting said increment or decrement.

2. A user interface comprising:
means for receiving user input representative of velocity of a mouse pointer relative to a datum point;
means for correlating said velocity to either an increment or a decrement of a variable by establishing said datum point as an origin of a first and second orthogonal axes, calculating a first change in position of said mouse pointer relative to said first axis axes, calculating a first relative position of said mouse pointer relative to said datum point along said second axis axes, calculating a second change in position of said mouse pointer relative to said second axis axes, calculating a second relative position of said mouse pointer relative to said datum along said first axis, wherein said means to correlate responsively increments when said first change in position is greater than zero and said first relative position is greater than zero, or when said second change in position is greater than zero and said second relative position is less than or equal to zero; and said means to correlate responsively decrements when said first change in position is less than zero and said first relative position is less than zero, or when said second change in position is greater than zero and said second relative position is greater than zero or equal to zero; and means for responsively effecting said increment or decrement.

3. A method for altering a parameter of a user interface in response to a velocity of a mouse pointer, the method comprising the steps of:

(i) establishing a datum point as an origin of four quadrants defined by first and second orthogonal axes;

(ii) determining the present quadrant in which a mouse pointer is moving;

(iii) calculating a velocity of said mouse pointer relative to said first and second orthogonal axes;

(iv) correlating said velocity to an increment or decrement of a parameter;

(v) incrementing said parameter when said mouse pointer velocity is in a first sense about said origin and decrementing said parameter when said mouse pointer velocity is in a second sense opposite said first sense; and (vi) repeating steps (ii) to (v) while said mouse pointer is moving.

4. A computer implemented control for altering a parameter of a user interface said system comprising:

means to receive user input representative of a velocity of a mouse pointer moving relative to a datum point;

means to correlate said user input to increment and decrement the parameter by establishing said datum point as an origin of four quadrants defined by first and second orthogonal axes, determining the present quadrant in which the mouse pointer is moving, calculating a change in position relative to said first and second orthogonal axes of said mouse pointer movement, correlating said change in position with said quadrant, and incrementing said parameter when said mouse pointer movement is in a first sense about said origin and for decrementing said parameter when said mouse pointer movement is in a second sense opposite said first sense; and means to responsively effect the increment or decrement of the parameter.

5. A computer implemented control for altering a parameter of a user interface said system comprising:

means to receive user input representative of a velocity of a mouse pointer moving relative to a datum point;

means to correlate said user input to increment and decrement the parameter by establishing said datum point as an origin of a first and second orthogonal axes, calculating a first change in position of said mouse pointer relative to said first axis, calculating a first relative position of said mouse pointer relative to said datum point along said second axis, calculating a second change in position of said mouse pointer relative to said second axis, calculating a second relative position of said mouse pointer relative to said datum along said first axis, wherein said means to correlate responsively increments when said first change in position is greater than zero and said first relative position is greater than zero, or when said second change in position is greater than zero and said second relative position is less than or equal to zero; and said means to correlate responsively decrements when said first change in position is less than zero and said first relative position is less than zero, or when said second change in position is greater than zero and said second relative position is greater than zero or equal to zero; and means to responsively effect the increment or decrement of the parameter.

6. An article of manufacture comprising:

a computer usable medium having computer readable program code means embodied therein for implementing a user interface, the computer readable program code means in the article of manufacture comprising:

computer readable program code means for causing the computer to accept input from a user representing a velocity of a mouse pointer relative to a datum point;

computer readable program code means for causing the computer to correlate said velocity to either an increment or a decrement of a variable by establishing said datum point as an origin of four quadrants defined by first and second orthogonal axes, determining the present quadrant in which the mouse pointer is moving, calculating a velocity of a mouse pointer relative to said first and second orthogonal axes, correlating said velocity to an increment or decrement of a parameter, and incrementing said parameter when said mouse pointer velocity is in a first sense about said origin and for decrementing said parameter when said mouse pointer velocity is in a second sense opposite said first sense; and computer readable program code means for causing the computer to responsively effect said increment or decrement.

* * * * *